UNITED STATES PATENT OFFICE.

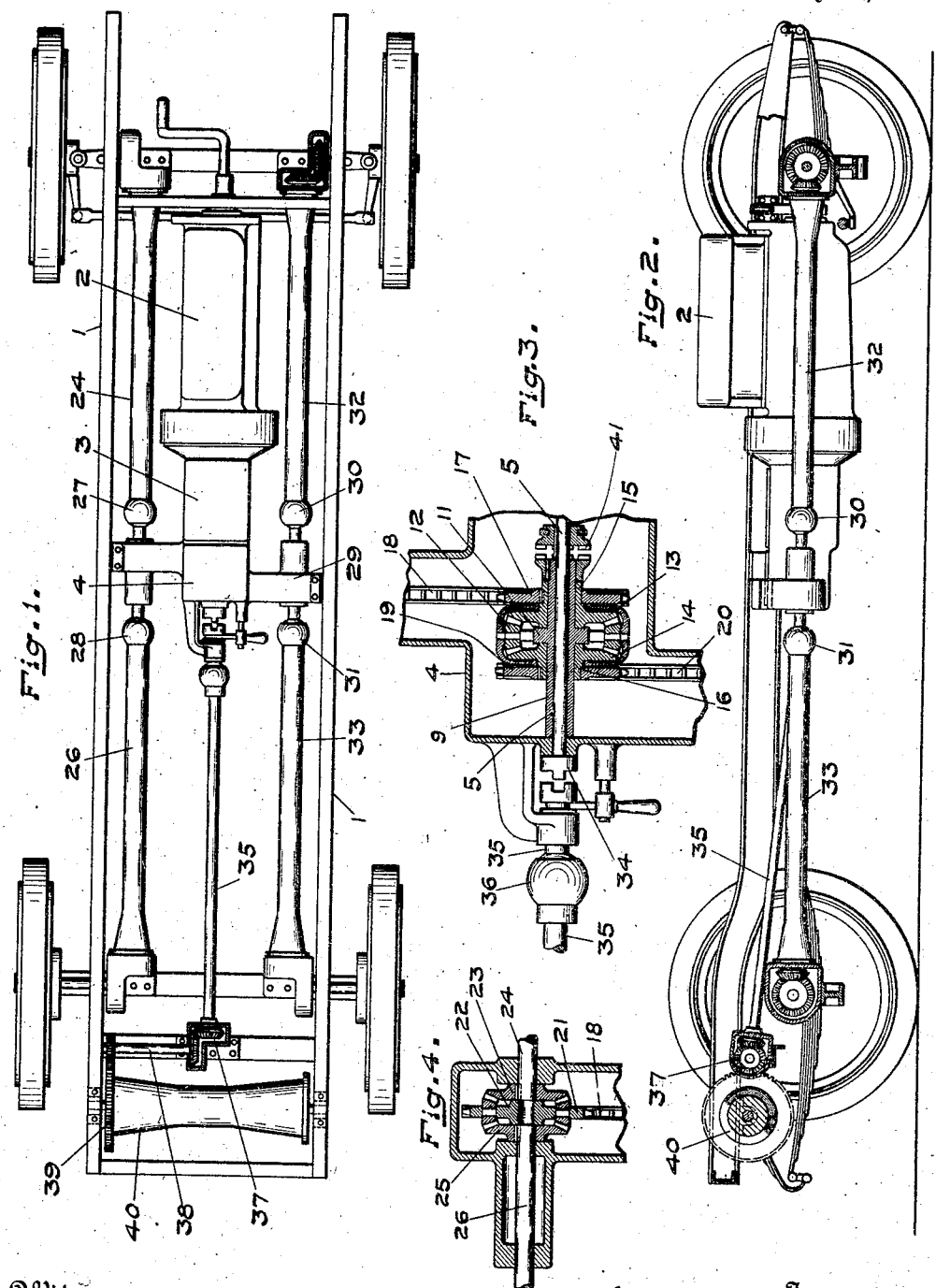

THEODORE H. MILLINGTON, OF WINNETKA, ILLINOIS.

POWER-TRANSMITTING MEANS FOR MOTOR-VEHICLES.

1,274,068.  Specification of Letters Patent.  Patented July 30, 1918.

Application filed May 17, 1916. Serial No. 98,099.

*To all whom it may concern:*

Be it known that I, THEODORE H. MILLINGTON, a citizen of the United States, residing at Winnetka, Cook county, and State of Illinois, have invented and discovered certain new and useful Improvements in Power-Transmitting Means for Motor-Vehicles, of which the following is a specification.

My invention relates to power transmitting means for motor driven vehicles and its object is to provide means whereby interchangeable transmission rods for both sides of the vehicle and adapted to drive all four wheels are provided, especially in conjunction with an arrangement which obtains a balanced disposition of the various units of the car with respect to one another and also of the parts of such units.

With this object in view, my invention is embodied in preferable form in the arrangement and construction hereinafter described and illustrated in the accompanying drawings.

In these drawings, Figure 1 is a top plan view, partly in section, of the chassis of a motor car showing my improvement applied thereto; Fig. 2, a side view in elevation; Fig. 3, a horizontal enlarged detail section of the main differential constituting one of the essential features of the invention and Fig. 4, an enlarged detail horizontal section of one of the individual differentials for the transmission shafts on one side of the chassis.

The invention relates particularly to a four wheel drive motor vehicle. Referring to the drawings, 1 is a chassis, 2 the engine, and 3 the change-speed transmission mechanism.

The engine is mounted on the central longitudinal line of the chassis and its shaft extends rearwardly in such line and is part of or is connected by and through the transmission, to a driving shaft 5, extending into the differential case 4. The shaft 5 is preferably in direct continuation of the engine shaft and in the central longitudinal line of the chassis and preferably also extends substantially in the same horizontal plane with that of the axles.

The shaft 5 which is the main driving element or propeller of the differential, carries a radial spider 11, which has mounted thereon a pair of idler bevel gears 12, which mesh with the bevel gears 13 and 14, and which carry the sleeves 15 and 16 respectively which are journaled on a sleeve 9. The sleeve 15 has fixed thereto a sprocket wheel 17 to which is connected a chain 18, which leads off to the transmission shafts on one side of the vehicle to drive the same. Similarly the sleeve 16 is provided with a sprocket wheel 19 adapted to engage and drive the sprocket chain 20 which leads to the transmission shafts on the opposite side of the vehicle. While bevel gears are shown as the connecting elements of the differential, other forms of connecting elements might be employed.

The sprocket chain 18 engages a sprocket wheel 22 mounted on a spider adapted to carry bevel gears which are adapted to mesh with a gear 23 fixed on a transmission shaft 24 extending to the drive mechanism of one of the front wheels. The bevel wheel fixed to the sprocket 22 also meshes with a bevel wheel 25 fixed on a transmission shaft 26 extending rearwardly to the driving mechanism of a rear driving wheel and in continuation of the front transmission shaft. The mechanism consisting of the wheels 22, 23 and 25, thus constitute a differential which is adapted to drive transmission shafts connected to the front and rear wheel on the same side of the vehicle. These shafts and their connections and driving elements are identical in construction and, therefore, interchangeable and are also identical in construction with similar transmission shafts employed to drive the front and rear wheels on the opposite side of the vehicle. Interposed in the line of the transmission shaft 24, between the body proper of the same and the differential is a universal joint 27 and a similar universal joint 28 is provided for the other shaft 26.

The sprocket chain 20 leads to and drives the driving element of a differential mechanism 29, the construction of which is identical with that described with respect to the other side of the vehicle. Universal joints 30 and 31 are interposed between this differential and the respective transmission shafts 32 and 33, leading to the front wheel and the rear wheel.

The shaft 5 is adapted to be connected by a coupling 34 with a shaft 35 which extends rearwardly in longitudinal continuation of the shaft 5 and the engine shaft, and in the line of such shaft 35, is interposed a universal joint 36. The shaft 35 extends rearwardly to driving mechanism 37 adapted to drive a shaft 38 connected by a suitable gearing 39 to a drum or winch 40, the purpose of which is to serve as a power driven windlass to assist in raising or lifting the truck from ditches and which may be employed for other power applying purposes.

The sleeve 9 is loosely mounted on the power shaft 5 and a clutch 41 is interposed between the main section of the shaft 5 and the forward end of said sleeve whereby said sleeve and shaft may be connected or disconnected for the purpose of driving or releasing the differential as desired, the purpose of which arrangement is to enable the winch to be operated without driving the differential mechanism.

With the above construction and arrangement it will be seen that the driving and driven elements of the differential unit contained in the casing 4 are concentric to the axis of the driving shaft 5 and an interior drive from the driving element outward to the driven elements is obtained, thus avoiding a peripheral drive construction such as is usually employed with the consequent avoidance of the necessity of off-setting the motor or the transmission shafts from the central longitudinal line of the chassis to accommodate them to such usual arrangement of the differential elements, which off-setting disposition of the units results either in the unbalancing of the car or in an inconvenient and unsymmetrical disposition of the parts to obtain balance.

With four transmission shafts leading to the four wheels of the vehicle, an arrangement is provided in which the shaft units are identical and interchangeable, thereby greatly facilitating the manufacture of such parts and lessening the cost of such manufacture and increasing the facility of repair.

Having thus described my invention, what I claim is:—

1. In power transmitting means for motor vehicles in combination with a differential mechanism, a power driving shaft therefor, and transmission shafts parallel with said power shaft at the sides of the chassis driving the four wheels of the vehicle, said differential having its driving and driven elements arranged concentric of said power driving shaft, and driving connections between said differential and the transmission shafts.

2. In power transmitting means for motor vehicles, in combination with a differential mechanism having a horizontal power driving shaft and having its driving and driven elements mounted concentrically of said shaft, power transmitting means in lines parallel to the power shaft and on each side of the power driving shaft leading to the front and rear wheels and means of connection between the differential and said side power transmitting means.

3. In power transmitting means for motor vehicles in combination with a differential mechanism having a horizontal power driving shaft and having its driving and driven elements mounted concentrically of said power driving shaft, interchangeable homologous transmission shafts on each side of the power driving shaft and parallel therewith leading separately to different wheels of the vehicle at the front and rear thereof, and means of driving connection between the differential and said side transmission shafts.

4. In a power transmitting means for motor vehicles in combination with a direct motor driven shaft, a main differential mechanism driven thereby and having its driving and driven elements concentric of the motor driven shaft, and separate homologous transmission shafts for the wheels of the vehicle parallel with the longitudinal axis of the chassis, and differentials between the said shafts for the wheels on each side of the vehicle and means of connection between the main differential and said shaft differentials.

5. In power transmitting means for motor vehicles, in combination with a driving shaft parallel with the longitudinal axis of the chassis, a main differential mechanism, said differential having the driving and driven elements thereof arranged concentrically of said shaft, interchangeable transmission shafts parallel with the driving shaft and corresponding to the front and rear wheels of the vehicle and adapted to drive the same and differential mechanisms between the front and rear shafts on each side and means of connection between the main differential and said shaft differentials.

6. In power transmitting means for motor vehicles, in combination with an engine, a main differential mechanism, a power shaft therefor extending substantially in the central longitudinal line of the chassis, said differential having the driving and driven elements thereof arranged concentrically of said shaft, and transmission shafts parallel with the power shaft, for the front and rear wheels of the vehicle arranged symmetrically of said driving shaft and having interchangeable constructions and differential mechanisms between the front and rear shafts of the pair on each side, and driving connections between the main differential and said side differentials.

7. In power transmitting means for motor vehicles in combination with an engine, a horizontal power shaft, a main differential operable by said power shaft and having its driving and driven means arranged concentric therewith, said shaft extending in the central longitudinal line of the chassis, four homologous transmission shafts parallel with the power shaft and operatively connected to the front and rear wheels of the vehicle and disposed symmetrically on opposite sides of said power shaft and a differential for the pair of transmission shafts on each side of the vehicle operatively connected with said main differential and an engine mounted substantially in the central longitudinal line of the chassis.

8. In power transmitting mechanism for motor vehicles, in combination with an engine, a horizontal power shaft operated therefrom, a multiple differential having the driving and driven elements thereof arranged concentrically of said driving shaft, a plurality of identical transmission shafts parallel with the power shaft and leading to the four wheels of the vehicle and a differential for the pair of transmission shafts on each side of the vehicle, connecting means between said main differential and said side differentials, a power transmitting shaft leading rearwardly from the main differential, substantially central of the chassis and means of releasable coupling between said shaft and said differential.

9. In a motor vehicle, a differential mechanism having a horizontal power shaft, a sleeve thereof a differential mechanism having its driving and driven elements mounted on said sleeve concentrically of said power shaft and having its driven elements operatively connected with driving wheels, an extension of said power shaft arranged horizontally beyond the differential, a clutch connecting the power shaft proper and said extension, a clutch between said sleeve and said power shaft proper, a winch and driving connections between said extension and said winch.

In witness whereof, I have hereunto set my hand and seal at Indianapolis, Indiana, this 9th day of May, A. D. nineteen hundred and sixteen.

THEODORE H. MILLINGTON. [L. S.]

Witnesses:
H. P. DOOLITTLE,
CLARA HAUG.